(12) United States Patent
Yamamoto et al.

(10) Patent No.: US 6,721,613 B1
(45) Date of Patent: Apr. 13, 2004

(54) JOURNAL FORM MANAGING METHOD, TRANSACTION PROCESSING APPARATUS, AND TRANSACTION RECORD JOURNAL FORM

(75) Inventors: Takaaki Yamamoto, Kawasaki (JP); Takeshi Suda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/280,691

(22) Filed: Mar. 30, 1999

(30) Foreign Application Priority Data

Jul. 27, 1998 (JP) ............................................ 10-210699

(51) Int. Cl.⁷ .......................... G06F 17/00; G06F 17/60
(52) U.S. Cl. .......................................... 700/90; 705/24
(58) Field of Search ......................... 700/90, 231, 236, 700/306; 283/70, 74, 81; 235/375, 379; 358/1.18; 705/24, 43; 708/173; 711/5

(56) References Cited

U.S. PATENT DOCUMENTS

| | | | | |
|---|---|---|---|---|
| 3,686,637 A | * | 8/1972 | Zachar et al. | 711/5 |
| 4,001,568 A | * | 1/1977 | Iizuka et al. | 705/43 |
| 4,283,769 A | * | 8/1981 | Asada | 708/173 |
| 6,091,510 A | * | 7/2000 | Kazo | 358/1.18 |

FOREIGN PATENT DOCUMENTS

| | | |
|---|---|---|
| JP | 59-169661 | 11/1984 |
| JP | 60-45895 | 3/1985 |
| JP | 60-83194 | 5/1985 |
| JP | 63-19280 | 1/1988 |
| JP | 10-188139 | 7/1988 |
| JP | 4-30293 | * 2/1992 |
| JP | 7-302367 | 11/1995 |
| JP | 8-293071 | 11/1996 |
| JP | 9-153186 | 6/1997 |
| JP | 10-188139 | * 7/1998 |

OTHER PUBLICATIONS

Notice for Reasons for Rejection dated Sep. 2, 2003 from Japanese Patent Office in corresponding application HEI 10–210699 Aug. 25, 2003.

* cited by examiner

*Primary Examiner*—Leo Picard
*Assistant Examiner*—Steven R. Garland
(74) *Attorney, Agent, or Firm*—Westerman, Hattori, Daniels & Adrian, LLP

(57) ABSTRACT

The present invention relates to a transaction processing apparatus, and this transaction processing apparatus is made up of a processing section for processing data on a transaction, a printing section for performing printing on a journal form while rolling the journal form, a transaction information printing control section for controlling the printing section so that information on the transaction is printed on the journal form, a detecting section for detecting a timing for taking out the rolled journal form, and an identification information printing control section for controlling the printing section so that identification information is printed in an area appearing at the outermost circumferential portion of the rolled journal form when the rolled journal form is taken out. In this transaction processing apparatus, by specifically designing an identification information printing portion of the rolled journal form, it is possible to easily and certainly identify a desired rolled journal form.

6 Claims, 6 Drawing Sheets

FIG.4

```
0001  1997-09-01  10:01
1234567891  ITEM1      ¥1000
2345678902  ITEM2       ¥200
2345678013  ITEM3     ¥30000

0002  1997-09-02  10:30
3456789014
4567890125  ITEM5      ¥4000
5678901236  ITEM6      ¥5000

******************************
STORE NUMBER S001 POS  NUMBER P001
   START    1997.09.05  10:01
   END      1997.09.05  20:00
******************************
```

100

101

JOURNAL FORM MANAGING METHOD, TRANSACTION PROCESSING APPARATUS, AND TRANSACTION RECORD JOURNAL FORM

BACKGROUND OF THE INVENTION (1) Field of the Invention

The present invention relates to a journal form managing method, a transaction processing apparatus and a transaction record journal form, suitable for the record and management of transactions in a POS terminal apparatus.

(2) Description of the Related Art

In the recent years, the commercial transaction circles have introduced the POS (Point Of Sales) system, while a POS terminal has been installed in each of stores or the like. The contents of everyday transactions are inputted to this POS terminal as occasion calls, and thereby information on these transactions are printed as transaction information on a journal form, which is set in the POS terminal, while the transaction information is transmitted through a communication line or the like to a host computer or the like in headquarters, which manages information on the tendency of good selling products, proceeds, and others.

The journal form to be set in the POS terminal is made by rolling up one lengthy paper and, when this journal form is set in the POS terminal and the contents of a transaction is inputted through the POS terminal, the transaction information is printed on receipt paper while being also printed on this journal form.

This journal form is made such that, when the transaction information is printed on its one surface, it is rolled up in a manner that the printed contents appear on the outer circumference of the resultant roll, and the print-finished rolled journal form, made in this way, is taken out from the POS terminal and is in safekeeping as transaction record.

In a prior journal form managing method, when an unprinted journal form is set in a POS terminal at the start of processing by the POS terminal such as the opening of a store, this POS terminal prints identification information (management information), comprising some pieces of information, such as a store number, a POS terminal number, the name of a terminal operator (or a code capable of identifying the terminal operator), the date and time of start of processing, at the leading position of this journal form.

Furthermore, also in the case that the unprinted part of a journal form mounted in the POS terminal runs short and the print-finished rolled journal form is taken out therefrom and replaced by a new unprinted journal form, when the unprinted journal form is set in the POS terminal, the aforesaid identification information are likewise printed at the leading position of the unprinted journal form newly set therein.

Thereafter, whenever a transaction such as buying and selling of goods occurs, the POS terminal operator inputs the contents of the transactions through the POS terminal, and thereby the contents of the transactions are printed on receipt paper and, further, are successively printed as a transaction record on the journal form.

Besides, at the time of the end of everyday transaction such as the closing of the store, the contents of the transactions are adjusted (that is, added up to calculate a total) at each POS terminal, and the result of the adjustment are printed at the rearmost position of a printed transaction record in the rolled journal form.

This print-finished rolled journal form, after being taken out from the POS terminal, is in safekeeping of a person in charge of POS terminal apparatus for a predetermined period of time. The Japanese tax law requires that such a print-finished rolled journal form should be in safekeeping for a predetermined period of time.

In this instance, for example, if an unclear point comes about in the transaction information in the future and hence there is a need to confirm this transaction information, the person in charge of the POS terminal or the like searches for the corresponding print-finished rolled journal form in the storage place, and finds out the transaction information to be examined in the print-finished rolled journal form to confirm the contents of the record printed.

However, in the case of this prior journal form managing method, the identification information is printed at only the leading position of the rolled journal form consequently, in order to confirm the identification information printed on the print-finished rolled journal form and further to specify a desired rolled journal form, there is a need to pull out the leading portion of the print-finished rolled journal form, that is, the portion of the print-finished rolled journal form closest to the core, and further to confirm the identification information printed at its leading position. It therefore involves a great deal of labor to search for the specific print-finished rolled journal form to be examined.

If the desired rolled journal form is identified by the date or time, it is possible to decide as to whether or not a print-finished rolled journal form is the desired one, by slightly pulling out the rearmost portion of the print-finished rolled journal form and referring to the date and time information recorded as transaction information on the journal form, on the basis of that date and time information.

However, particularly in the case that a large number of POS terminals are installed and used within one store as seen in a department store or the like, a large number of print-finished rolled journal forms are created per day, and hence, a great deal of labor is taken for finding a specific rolled journal form to be examined from the large number of rolled journal forms.

Although, in order to facilitate the quick search of a specific rolled journal form to be examined from the large number of rolled journal forms, there is a way that a person in charge of the POS terminal or the like handwrites identification information on an outer circumferential portion or the like of the print-finished rolled journal form when the print-finished rolled journal form is taken out from the POS terminal, such a handwriting way creates a problem in that an error or an omission tends to occur in writing of the identification information.

SUMMARY OF THE INVENTION

The present invention has been developed in view of these problems, and it is therefore an object of this invention to provide a journal form managing method, a transaction processing apparatus and a transaction record journal form which are capable of easily and certainly making an identification of a desired rolled journal form by specifically designing a printing portion of identification information on a rolled journal form, thereby shortening the time needed for its retrieval.

For this purpose, in accordance with this invention, there is provided a journal form managing method of, in a transaction processing apparatus which processes data on a transaction, printing information on the transaction as transaction information on a journal form and of rolling the journal form, on which the transaction information is printed, so that the journal form is in safekeeping as a rolled journal form, the method comprising the steps of detecting a timing for taking out the rolled journal form, on which the transaction information is printed, from the transaction processing apparatus, if said timing is detected, printing identification information, which specifies the contents of the transaction information printed on the rolled journal form, in an area appearing at the outermost circumferential portion of the rolled journal form when the rolled journal form is taken out, and taking out the rolled journal form from the transaction processing apparatus for safekeeping.

Furthermore, in accordance with this invention, there is provided a transaction processing apparatus comprising a processing section for processing data on a transaction, a printing section for performing printing on a journal form while rolling the journal form, a transaction information printing control section for controlling the printing section so that information on the transaction is printed on the journal form as transaction information, a detecting section for detecting a timing for taking out the rolled journal form on which the transaction information is printed, and an identification information printing control section for, if the detecting section detects the timing, controlling the printing section so that identification information, which specifies the contents of the transaction information printed on the rolled journal form, is printed in an area appearing at the outermost circumferential portion of the rolled journal form when the rolled journal form is taken out.

Still further, in accordance with this invention, there is provided a transaction record journal form on which information on a transaction is printed as transaction information in a transaction processing apparatus which processes data on the transaction, wherein identification information which specifies the contents of the transaction information printed is printed at its end portion.

Thus, according to the journal form managing method, the transaction processing apparatus and the transaction record journal form provided by this invention, a timing for taking out the rolled journal form, on which the transaction information is printed, from the transaction processing apparatus is detected, and in response to the detection of this timing, identification information which specifies the contents of the transaction information printed on the rolled journal form is printed in an area appearing at the outermost circumferential portion of the rolled journal form when the rolled journal form is taken out, and then, the rolled journal form is taken out from the transaction processing apparatus for safekeeping. This allows an easy identification of the rolled journal form and further an easy search of a specific print-finished rolled journal form, thereby considerably shortening the time needed for its retrieval. In addition, the operator or the like of the transaction processing apparatus is not required to handwrite identification information, which can lighten the labor of the operator or the like of the transaction processing apparatus, and prevents the occurrence of an error or an omission in writing to sharply improve the reliability.

BRIEF DESCRIPTION OF THE DRAWINGS

FIG. 4 is an illustration of a portion indicated by an arrow A in FIG. 3;

DESCRIPTION OF THE PREFERRED EMBODIMENTS (a) Description of an Aspect of this Invention First of all, referring to FIG. 1, a description will be made hereinbelow of an aspect of this invention.

Figure 1:
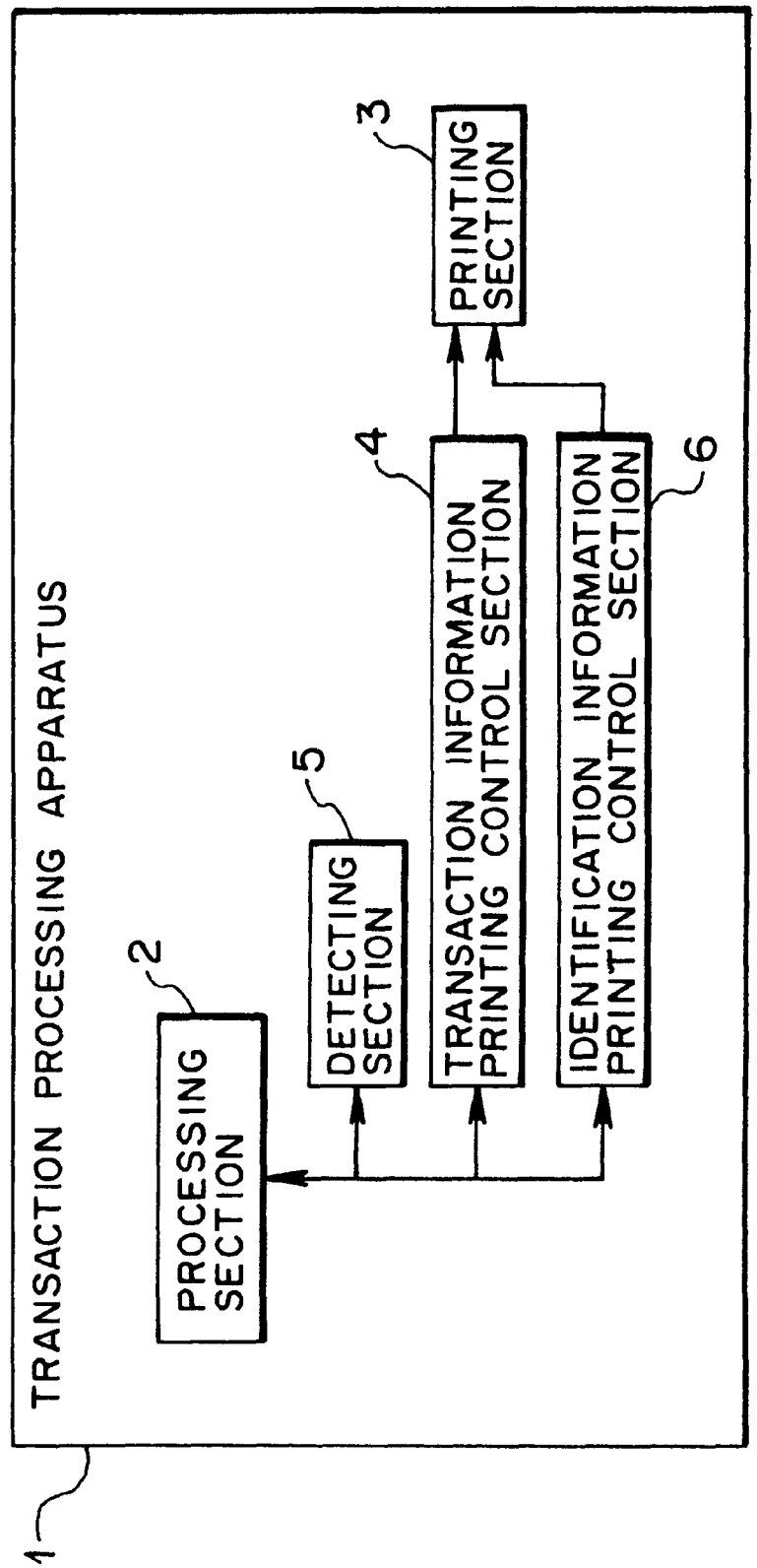
FIG. 1 is a block diagram showing an aspect of the present invention.

FIG. 1 is a block diagram showing the aspect of this invention. As shown in FIG. 1, a transaction processing apparatus 1 according to this invention is characterized by comprising a processing section 2 for processing data on a transaction, a printing section 3 for performing printing on a journal form while rolling the journal form, a transaction information printing control section 4 for controlling the printing section 3 so that the information on the transaction is printed on the journal form as transaction information, a detecting section 5 for detecting a timing for taking out the rolled journal form on which the transaction information is printed, and an identification information printing control section 6 for, if the detecting section 5 detects the timing, controlling the printing section 3 so that identification information, which specifies the contents of the transaction information printed on the rolled journal form, is printed in an area appearing at the outermost circumferential portion of the rolled journal form when the rolled journal form is taken out.

With this construction, when the detecting section 5 detects the timing for taking out the rolled journal form on which the transaction information is printed, the identification information printing control section 6 controls the printing section 3 so that the identification information which specifies the contents of the transaction information recorded on the rolled journal form is printed in the area appearing at the outermost circumferential portion of the rolled journal form when the rolled journal form is taken out.

Furthermore, a journal form managing method according to this invention is for use in a transaction processing apparatus which processes data on a transaction, and is for printing information on the transaction on a journal form as transaction information and rolling the journal form, on which the transaction information is printed, so that the journal form is in safekeeping as a rolled journal form, and is characterized by comprising the steps of detecting a timing for taking out the rolled journal form, on which the transaction information is printed, from the transaction processing apparatus, if the timing is detected, printing identification information, which specifies the contents of the transaction information printed on the rolled journal form, in an area appearing at the outermost circumferential portion of the rolled journal form when the rolled journal form is taken out, and taking out the rolled journal form from the transaction processing apparatus for safekeeping.

At this time, it is also appropriate that the timing is the time when one or more of transactions have been finished and the adjustment on the transactions is completed, and that, after the printing of the identification information, the rolled journal form is separated from an unprinted journal form in the transaction processing apparatus and is taken out therefrom.

In addition, it is also appropriate that the timing is the time when the end of the journal form in the transaction processing apparatus is detected, and that, after the printing of the identification information, the rolled journal form is taken out from the transaction processing apparatus while an unprinted journal form is supplied.

Furthermore, it is also possible that the identification information includes at least one of the following pieces of information; the date and time of the start of the processing by the transaction processing apparatus, information for specifying the transaction processing apparatus, information for specifying the operator of the transaction processing apparatus and the date and time of the completion of the processing by the transaction processing apparatus.

Still further, it is also possible that the detecting section 5 detects, as the timing, the time when the processing section 2 has finished processing one or more of transactions and completes the adjustment on the transactions, or that the detecting section 5 detects, as the timing, the time when the journal form ends.

Moreover, it is also acceptable that the identification information includes at least one of the following pieces of the date and time of the start of the processing by the processing section 2, information for specifying this apparatus, information for specifying an operator of this apparatus and the date and time of the completion of the processing by the processing section 2.

It is also appropriate that the transaction record journal form is rolled whenever the transaction information is printed and is in safekeeping as a rolled journal form and that the identification information is printed in an area appearing at the outermost circumferential portion thereof when the transaction record journal form is taken out from the transaction processing apparatus.

Thus, in the journal form managing method, the transaction processing apparatus and the transaction record journal form according to this invention, a detection is made of the timing for taking out the rolled journal form, on which the transaction information has been printed, from the transaction processing apparatus, and if the timing is detected, the identification information, which specifies the contents of the transaction information printed on the rolled journal form, is printed in an area appearing at the outermost circumferential portion of the rolled journal form when the rolled journal form is taken out, and then, the rolled journal form is taken out from the transaction processing apparatus for safekeeping. Consequently, the identification of the rolled journal form becomes quite feasible and the search of a specific print-finished rolled journal form becomes easily possible, which considerably shortens the time needed for the retrieval. In addition, since there is no need for an operator or the like of the transaction processing apparatus to handwrite the identification information, it is possible to lighten the labor of the operator or the like of the transaction processing apparatus and to prevent an error or an omission in writing of the identification information, and hence the reliability sharply improves.

Besides, it is also appropriate that the timing is the time of the termination of the transaction and the completion of the exact calculation processing on the transaction and, after the printing of the identification information, the rolled journal form is separated and taken out from an unprinted journal form in the transaction processing apparatus. In consequence, it is possible to easily identify the rolled journal form on which the exact calculation processing comes to an end, and hence, to considerably shorten the time needed for the retrieval. Further, since there is no need for the operator or the like of the transaction processing apparatus to handwrite the identification information, it is possible to lighten the labor of the operator or the like of the transaction processing apparatus, and to prevent an error or an omission in writing of the identification information, thus sharply improving the reliability.

Furthermore, it is also appropriate that the timing is the time of the detection of the end of the journal form within the transaction processing apparatus and, after the printing of the identification information, the rolled journal form is taken out from the transaction processing apparatus and an unprinted journal form is supplied. In consequence, it is possible to easily identify the rolled journal form which halfway comes to an end, and hence, to considerably shorten the time needed for the retrieval. In addition, since there is no need for the operator or the like of the transaction processing apparatus to handwrite the identification information, it is possible to lighten the labor of the operator or the like of the transaction processing apparatus, and to prevent an error or an omission in writing of the identification information, thus sharply improving the reliability.

Moreover, it is also acceptable that the identification information includes at least one of the date and time of the start of the processing by the transaction processing apparatus, information for specifying the transaction processing apparatus, information for specifying an operator of the transaction processing apparatus and the date and time of the completion of the processing by the transaction processing apparatus. Consequently, it is possible to easily identify a specific rolled journal form.

(b) Description of an Embodiment of this Invention

An embodiment of the present invention will be described hereinbelow with reference to the drawings.

Figure 2:
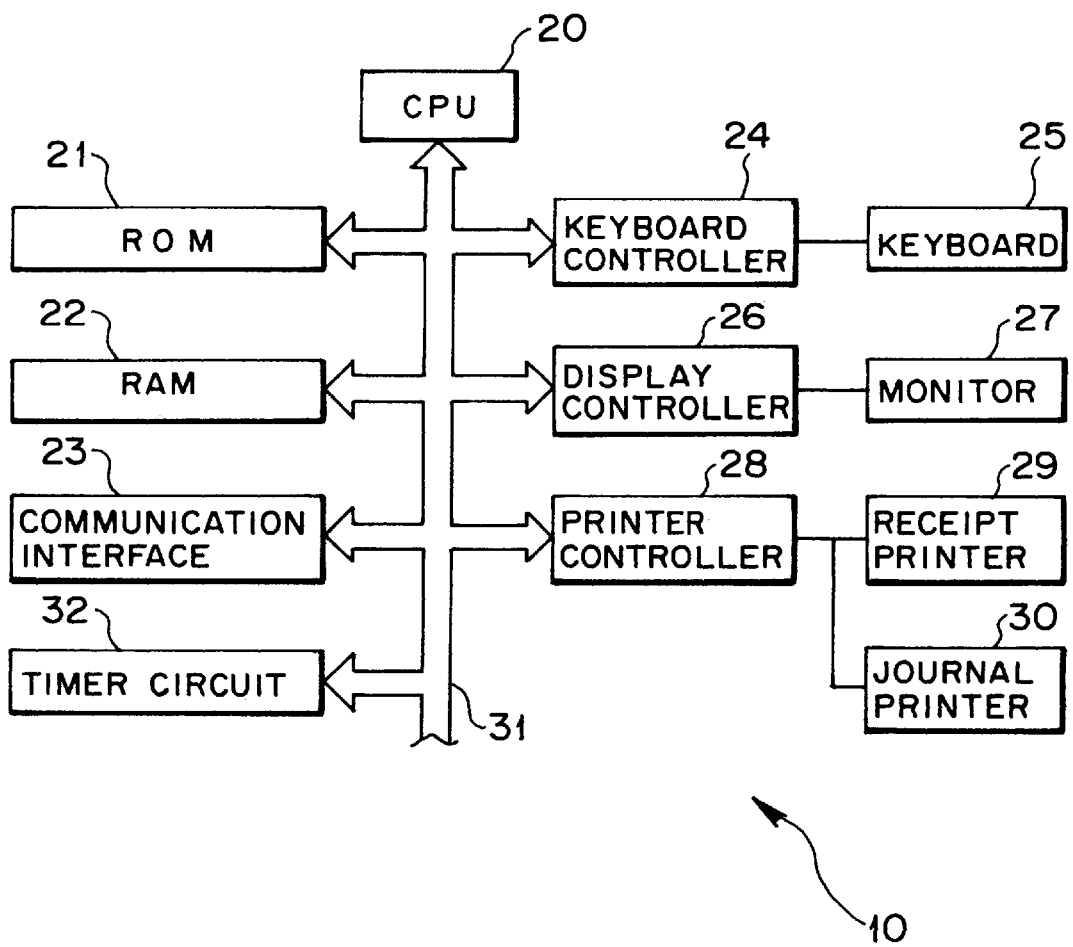
FIG. 2 is a block diagram illustratively showing a construction of a principal portion of a transaction processing apparatus according to an embodiment of this invention.
Figure 3:
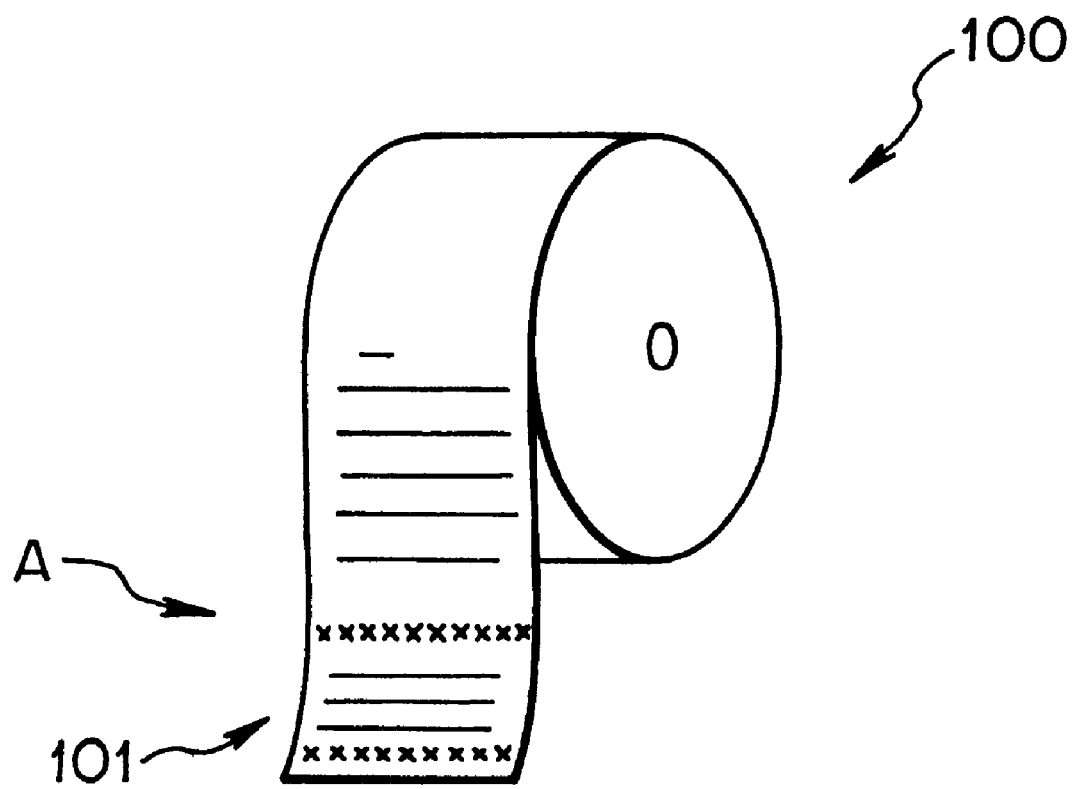
FIG. 3 is a perspective view illustratively showing a print-finished rolled journal form taken out from the transaction processing apparatus according to this embodiment.

FIG. 2 is a block diagram illustratively showing a construction of a principal portion of a transaction processing apparatus according to an embodiment of this invention, FIG. 3 is a perspective view illustratively showing a print-finished rolled journal form removed from the transaction processing apparatus according to this embodiment, and FIG. 4 is an illustration of the portion indicated by the arrow A in FIG. 3.

In the recent years, POS (Point Of Sales) terminals (transaction processing apparatus) have been installed in stores or the like, and the contents of everyday transaction are inputted to this POS terminal, generally designated at numeral 10, by a POS terminal operator as occasion calls, and thereby the contents of transactions are printed on receipt paper, and the information on the transactions is printed on a rolled journal form 100 shown in FIG. 3 as transaction information, and further, this transaction information is transmitted through a communication line or the like to a host computer in headquarters for managing information on the tendency of good selling products, proceeds, and others.

The POS terminal 10 is, as shown in FIG. 2, made up of a CPU 20, a ROM 21, a RAM 22, a communication interface 23, a keyboard controller 24, a keyboard 25, a display controller 26, a monitor 27, a printer controller 28, a receipt printer 29, a journal printer 30, a timer circuit 32 and a system bus 31.

The ROM 21 is a memory for previously storing various kinds of programs required for operating the POS terminal 10. The RAM 22 is a memory for temporarily storing various data, being designed to store identification information 101, that is, some pieces of information such as the date and time of the start of the processing in the POS terminal 10, information for specifying the POS terminal 10, information for specifying an operator of the POS terminal 10, and others.

In this case, among the information for specifying the POS terminal 10 to be stored, for example, there are the number allocated to the store in which the POS terminal is installed, information on the floor or information on the counter on which the POS terminal 10 is located, an identification number of each of the POS terminals 10, and others.

The CPU 20 is a central control unit for controlling the operation of each of circuits apparatus in accordance with a program stored in the ROM 21, and is for processing data on a transaction, and corresponds to the processing section in FIG. 1.

The keyboard 25 is an input unit comprising numeral keys, category keys, a subtotal key, a deposit/cash total key, a delete key and others, and the POS terminal operator performs various input operations through this keyboard 25.

The keyboard controller 24 controls the operation of the keyboard 25 and communicates the contents, inputted through the keyboard 25, to the CPU 20 and others.

The communication interface 23 is an interface for making a connection through a non-shown communication line or the like to a host computer in headquarters or the like, and performs the transmission/receive of various data to/from the host computer in the headquarters or the like.

The monitor 27 is a display unit for displaying various kinds of information, while the display controller 26 is for controlling the operation of the monitor 27.

The receipt printer 29 is a printing apparatus for printing the contents of a transaction or the like on receipt paper (not shown).

A journal form is detachably mounted in the journal printer 30. This journal printer 30 is for printing information on a transaction and identification information while rolling an unprinted journal form, and corresponds to the printing section 3 in FIG. 1.

A lengthy journal form on which printing is made by the journal printer 30 is rolled within the POS terminal 10 whenever the information on a transaction is printed, and is removed from the interior of the POS terminal 10 at a predetermined timing as a rolled journal form 100 shown in FIG. 3.

The printer controller 28 is a control unit for controlling the operation of the receipt printer 29 and the journal printer 30, with various information being printed on receipt paper and a journal form by the receipt printer 29 and the journal printer 30, respectively.

This printer controller 28 is made to control the journal printer 30 so that information on a transaction, that is, information about the name of an article put into transaction, a unit cost of an article, the number of goods put into transaction and others, are printed on a journal form as transaction information, and serves as the transaction information printing control section 4 in FIG. 1.

Furthermore, the printer controller 28 controls the journal printer 30 to, prior to starting to print the transaction information on the journal form, print identification information 101 in a leading area of the journal form, while controlling the journal printer 30 to, in response to a detection of a predetermined timing for removing the rolled journal form 100, print the identification information 101, which specifies the contents of the transaction information printed on the rolled journal form 100, in an area appearing at the outermost circumferential portion of the print-finished rolled journal form 100 when being taken out, that is, at an end portion of the rolled journal form 100, and functions as the identification information printing control section 6 in FIG. 1.

In addition, the journal printer 30 is equipped with a non-shown journal form near-end detecting device, and when the rest of a print-unfinished journal form mounted in the journal printer 30 becomes below a predetermined value, the journal form near-end detecting device makes a judgment that the rest of the print-unfinished is scanty (detects a journal form near-end) and informs the POS terminal operator of the detection of the journal form near-end by means of, for example, displaying this fact on the monitor 27 or issuing an alarm sound.

Moreover, the journal printer 30 is equipped with a non-shown journal form end detecting device, which detects the fact that the end portion of an unprinted journal form, mounted in the journal printer 30, passes through a position on the upstream side of a printing conducting portion of the journal printer 30 (detects the journal form end) to inform the POS terminal operator of the detection of the journal form end by means of, for example, displaying this fact on the monitor 27 or giving an alarm sound.

In this journal form end detecting device, a light-emitting element and a light-receiving element are disposed on the upstream side of the printing conducting portion of the journal printer 30 to a print-unfinished journal form and at opposite positions to each other across the print-unfinished journal form, and an optical output always takes place from the light-emitting element to the light-receiving element. When the print-unfinished journal form, running between the light-emitting element and the light-receiving element while intercepting the light therebetween, disappears and thereby the light-receiving element receives the light outputted from the light-emitting element, this device judges that the print-unfinished journal form runs out (decision to the journal form end).

Furthermore, in the POS terminal 10 according to this embodiment, the time that the journal form end detecting device detects the journal form end and the time that the CPU 20 completes the adjustment on transactions in accordance with a closing processing instruction inputted through an operation of the keyboard 25 by the POS terminal operator are communicated as the aforesaid predetermined timing (timing for taking out the rolled journal form 100) to the printer controller 28. That is, in this embodiment, the journal form end detecting device, the keyboard 25 and the CPU 20 function as the detecting section 5 in FIG. 1. In this case, it is also appropriate that the timing for the detection of the journal form end is directly communicated from the journal form end detecting device to the printer controller 28, and that the POS terminal operator, when recognizing that timing, operates the keyboard 25 for making a notice to the printer controller 28.

The system bus 31 is a bus line for making a connection among the respective circuits apparatus, and various kinds of data, instructions or the like are sent through this system bus 31 between the respective circuits apparatus. The timer circuit 32 is a circuit apparatus for measuring the date and time, and informs the CPU 20 or the printer controller 28 of the present date and time in answer to a request from the CPU 20 or the printer controller 28.

The POS terminal (transaction processing apparatus) 10 constituting an embodiment of this invention is constructed as described above, and referring to the flow charts of FIGS. 5 and 6, a description will be made hereinbelow of a journal form managing method of managing a journal form through the use of this POS terminal 10.

Figure 5:
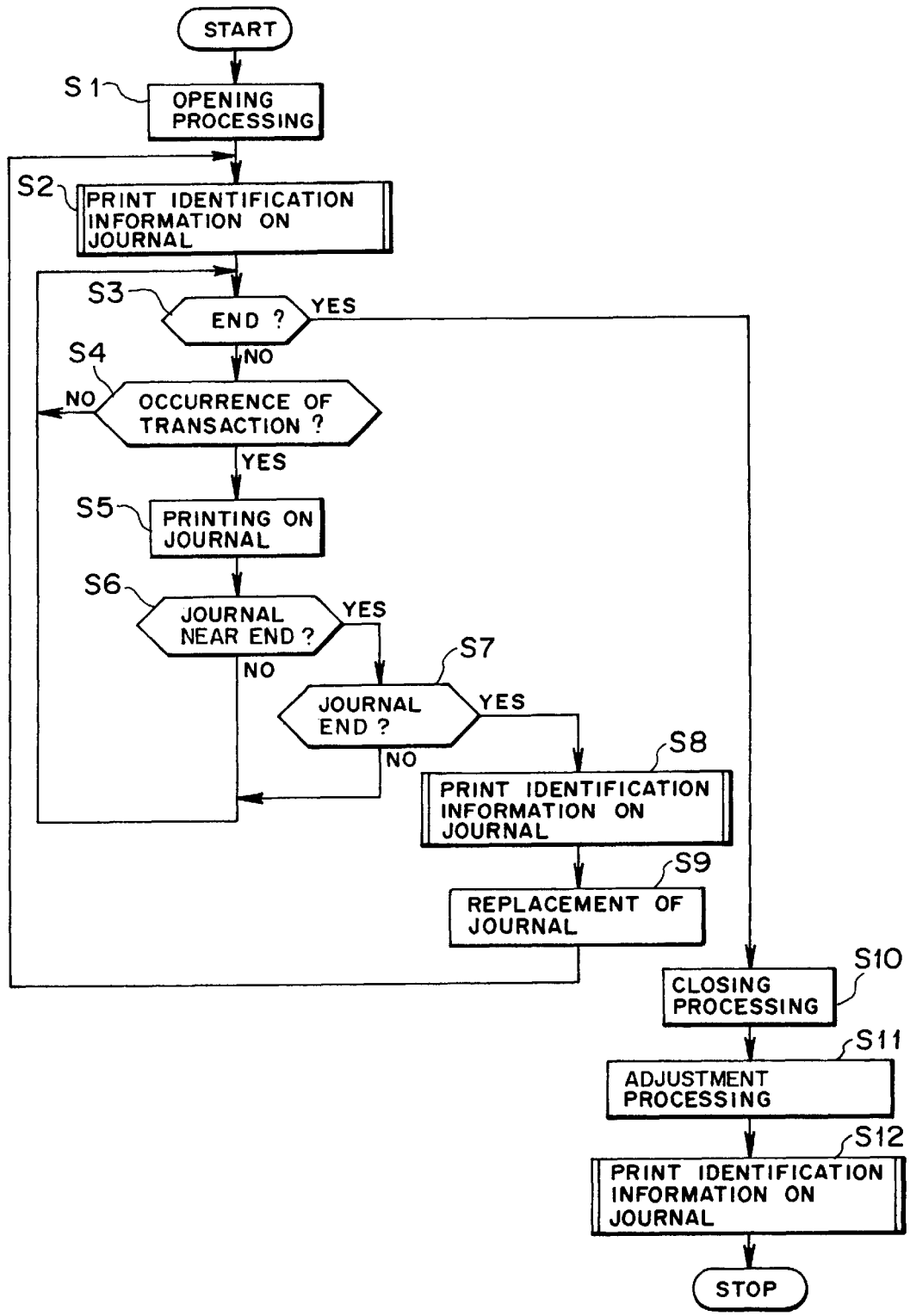
FIG. 5 is a flow chart for describing a journal form managing method according to an embodiment of this invention.
Figure 6:
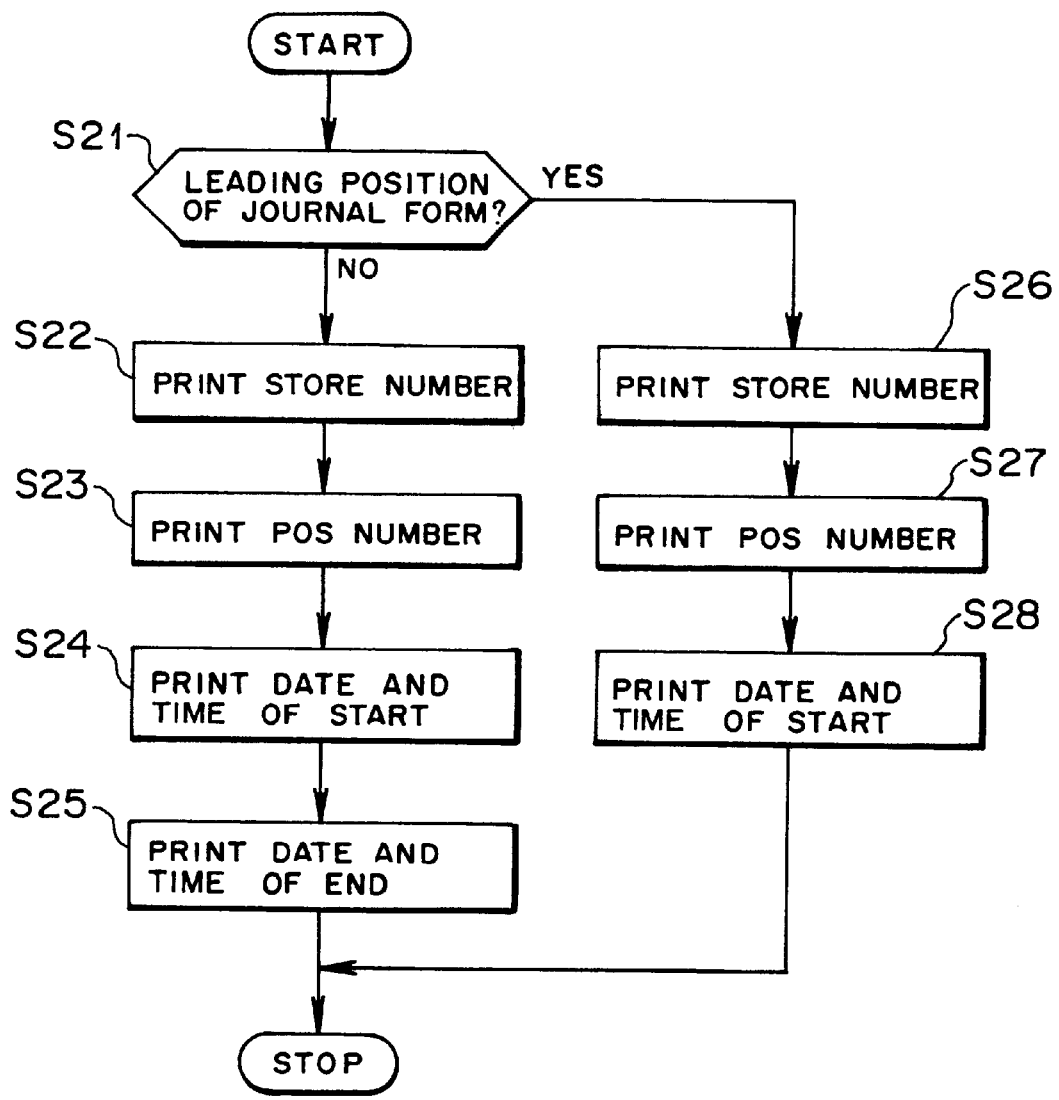
FIG. 6 is a flow chart for explaining a subroutine for printing identification information.

FIG. 5 is a flow chart (steps S1 to S12) for describing a journal form managing method according to an embodiment of this invention, and FIG. 6 is a flow chart (steps S21 to S28) for explaining a subroutine for printing identification information.

At the time of the start of the processing by the POS terminal 10, such as at the opening of business (step S1), the POS terminal operator sets an unprinted journal form in the journal printer 30. At this time, in a manner that the POS terminal operator gives an instruction through the use of the keyboard 25 to print the identification information 101 on the unprinted journal form, or that the printer controller 28 automatically controls the journal printer 30 in connection with the start-up of the POS terminal 10, the identification information 101 is printed at a leading position of the unprinted journal form (step S2).

Referring here to FIG. 6, a description will be given of one example of a procedure for the printing of the identification information 101 on a journal form in steps S2, S8 and S12 of FIG. 5.

First, a decision is made, on the basis of input by the keyboard 25 or the like, as to whether or not the identification information 101 is printed at the leading position of an unprinted journal form (that is, whether being an opening processing or not) (step S21). If the identification information 101 is printed at the leading position of the unprinted journal form (YES route from step S21), a store number or an identification number of the POS terminal 10 stored in the RAM 22 is printed as store identifying information (steps S26 and S27), and further, by reference to the timer circuit 32, the present date and time are printed as the date and time of the opening processing (that is, the date and time of the start of processing) (step S28). The date and time of the start of the processing are written in the RAM 22 and retained there until that processing comes to an end.

On the other hand, if the position of the printing of the identification information 101 is not at the leading position of the journal form, in other words, if the identification information 101 is printed at the rearmost portion position (NO route from step S21), as shown in FIG. 4, the store number, the identification number of the POS terminal 10 and the date and time of the start of the processing, which are stored in the RAM 22, are printed (steps S22 to S24), and further, by reference to the timer circuit 32, the present date and time are printed as the date and time of the completion of the processing (step S25).

After the printing of the store number, the POS number and the date and time of the start constituting the identification information 101 on the journal form, a decision is made as to whether the processing by the POS terminal 10 terminates or not (step S3). If the POS terminal 10 is continuously used without terminating (NO route from step S3), a decision is made as to whether a further transaction occurs or not (step S4).

If the transaction does not occur (NO route from step S4), the operational flow returns to the step S3 to wait for the occurrence of a transaction until an input is made through the keyboard 25 to bring the POS terminal 10 to close (steps S3 to S4).

When a transaction occurs (YES route from step S4), the CPU 20 conducts processing such as calculations, and uses the receipt printer 29 to print that transaction contents on receipt paper, and further, uses the journal printer 30 to print transaction information on a journal form (step S5), with the print-finished journal form being rolled into the rolled journal form 100.

Furthermore, the non-shown journal form near-end detecting device makes a decision on whether the journal form near-end is detected or not (step S6). If the journal form near-end is detected (YES route from step S6), this fact is displayed on the monitor 27 to be known by the POS terminal operator, and further, the journal form end detecting device makes a decision as to whether the journal form end is detected or not (step S7).

If the journal form near-end detecting device does not detect the journal form near-end (NO route from step S6), and if the journal form end detecting device does not detect the journal form end (NO route from step S7), the operational flow returns to the step S3. On the other hand, if the journal form end detecting device detects the journal form end (YES route from step S7), the printer controller 28 controls the journal printer 30 to print, as the identification information 101, the store number, the POS number, the data and time of the start of the processing and the date and time of the end of the processing, in an area from the rearmost position of the transaction information printed on the rolled journal form 100 to the end of the rolled journal form 100, as shown in FIG. 4 (step S8).

The POS terminal operator removes the print-finished rolled journal form 100 from the POS terminal 10, and then, supplies an unprinted journal form to the POS terminal 10 (step S9). Then, the operational flow returns to the step S2. At this time, the POS terminal operator gives an instruction through the keyboard 25 to print the identification information at the leading position of a new unprinted journal form and thereby the printer controller 28 controls the journal printer 30 to print the store number, the POS number and the date and time of the start of the processing as the identification information 101 at the leading position of the unprinted journal form (step S2).

Furthermore, when finishing the POS terminal 10 (YES route from step S3), the POS terminal operator gives an instruction for the closing processing through the keyboard 25 so that the POS terminal 10 is put into the closing processing (step S10), and the adjustment processing for the transactions done up to that time is conducted (step S11). In this adjustment, the information about all the transactions done in the POS terminal 10 from when the POS terminal 10 starts the processing until the POS terminal 10 completes the processing are read out from the RAM 22 so that the proceeds of sales are adjusted.

After the completion of the adjustment processing, the printer controller 28 controls the journal printer 30 so that, as shown in FIG. 4, the store number, the POS number, the date and time of the start of the processing and the date and time of the end of the processing are printed as the identification information 101 at the rearmost position of the transaction information printed on the rolled journal form 100 (step S12), and the person in charge of the POS terminal 10 or the like separates this print-finished rolled journal form 100 from the print-unfinished journal form in the POS terminal 10 for safekeeping.

As described above, according to the journal form managing method, the transaction processing apparatus and the transaction record journal form constituting an embodiment of this invention, when the timing for removing a print-finished rolled journal form 100 is detected by the CPU 20, the keyboard controller 24 and others, the printer controller 28 and the journal printer 30 print the identification information 101, which specifies the contents of the transaction information printed on the rolled journal form 100, in an area appearing at the outermost circumferential portion of the print-finished rolled journal form 100 when being taken out, that is, the end portion of the rolled journal form 100, and therefore, there is no need for the person in charge of the POS terminal 10 or the like to pull out the rolled journal form on all such occasions for confirming the identification information 101 printed at the leading portion or the like of the rolled journal form 100, and the person in charge of the POS terminal 10 or the like can easily identify the rolled journal form 100 by only viewing the identification information 101 printed at the end portion of the rolled journal form 100, and can easily find the specific print-finished rolled journal form 100 to be checked, so that it is possible to considerably shorten the time for the retrieval.

Accordingly, even in the case that a large number of POS terminals 10 are installed as seen in, for example, a department store, it is possible to easily search for a specific print-finished rolled journal form 100 being examined in a large number of produced rolled journal forms 100, and hence, to considerably reduce the time needed for its retrieval.

In addition, since there is no need for the POS terminal operator or the like to handwrite the identification information 101, it is possible to lighten the labor of the POS terminal operator, and further, to prevent an error or an omission in writing of the identification information, thus sharply improving the reliability.

Although, in the above-described embodiment, the date and time of the start of processing by the POS terminal 10, the number of the store in which the POS terminal 10 is located, the information on the floor or the counter on which the POS terminal 10 is placed, the identification number of each POS terminal 10, the information for specifying the operator of the POS terminal 10, and others are stored and printed as the identification information 101 on a journal form, it should be understood that the present invention is not limited to this, and that it is intended to cover all changes and modifications of the embodiment of the invention herein which do not constitute departures from the spirit and scope of the invention.

What is claimed is:

1. A journal form managing method of, in a transaction processing apparatus which processes data on one or more transactions, printing information on said transaction as transaction information on a journal form and of rolling said journal form, on which said transaction information is printed, so that said journal form is in safekeeping as a rolled journal form, said method comprising the steps of:
   detecting a timing for taking out said rolled journal form, on which said transaction information is printed, from said transaction processing apparatus;
   if said timing is detected, printing identification information, which specifies the contents of said transaction information printed on said rolled journal form and which includes at least the time and the date of the start of processing with respect to said journal form by said transaction processing apparatus, in an area appearing at the outermost circumferential portion of said rolled journal form when said rolled journal form is taken out; and
   taking out said rolled journal form from said transaction processing apparatus for safekeeping, wherein:
      said timing is selective one from a time when said one or more transactions have been finished and when adjustment processing for said transactions is completed and a time when the end of said journal form in said transaction processing apparatus is detected;
      if said selected timing is first-named timing, said rolled journal form is separated from a print-unfinished journal form in said transaction processing apparatus and is taken out; and
      if said selected timing is second-named timing, said rolled journal form is taken out from said transaction processing apparatus and an unprinted journal form is supplied.

2. A journal form managing method as defined in claim 1, wherein said identification information includes at least one of the date and time of the start of processing by said transaction processing apparatus, information for specifying said transaction processing apparatus, information for specifying an operator of said transaction processing apparatus and the date and time of the completion of said processing by said transaction processing apparatus.

3. A transaction processing apparatus comprising:
   a processing section for processing data on one or more transactions;
   a printing section for performing printing on a journal form while rolling said journal form;
   a transaction information printing control section for controlling said printing section so that information on said transaction is printed on said journal form as transaction information;
   a detecting section for detecting a timing for taking out said rolled journal form on which said transaction information is printed; and
   an identification information printing control section for, if said detecting section detects said timing, controlling said printing section so that identification information, which specifies the contents of said transaction information printed on said rolled journal form and which includes at least the time and the date of the start of processing with respect to said journal form by said processing section, is printed in an area appearing at the outermost circumferential portion of said rolled journal form when said rolled journal form is taken out,
   wherein:
      said timing is selective one from a time when said one or more transactions have been finished and when adjustment processing for said transactions is completed and a time when the end of said journal form in said transaction processing apparatus is detected;
      if said selected timing is first-named timing, said rolled journal form is separated from a print-unfinished journal form in said transaction processing apparatus and is taken out; and
      if said selected timing is second-named timing, said rolled journal form is taken out from said transaction processing apparatus and an unprinted journal form is supplied.

4. A transaction processing apparatus as defined in claim 3, wherein said identification information includes at least one of the date and time of the start of processing by said processing section, information for specifying said apparatus, information for specifying an operator of said apparatus and the date and time of the completion of said processing by said processing section.

5. A journal form managing method of, in a transaction processing apparatus which processes data on one or more transactions, printing information on said transaction as transaction information on a journal form and of rolling said journal form, on which said transaction information is printed, so that said journal form is in safekeeping as a rolled journal form, said method comprising the steps of:
   detecting a timing for taking out said rolled journal form, on which said transaction information is printed, from said transaction processing apparatus; and
   if said timing is detected, printing identification information, which specifies the contents of said transaction information printed on said rolled journal form and which includes at least the time and the date of the start of processing with respect to said journal form by said processing section, in an area appearing at the outermost circumferential portion of said rolled journal form when said rolled journal form is taken out, wherein:
said timing is selective one from a time when said one or more transactions have been finished and when adjustment processing for said transactions is completed and a time when the end of said journal form in said transaction processing apparatus is detected;
if said selected timing is first-named timing, said rolled journal form is separated from a print-unfinished journal form in said transaction processing apparatus and is taken out; and if said selected timing is second-named timing, said rolled journal form is taken out from said transaction processing apparatus and an unprinted journal form is supplied.

6. A journal form managing method as defined in claim 5, wherein said identification information includes at least one of the date and time of the start of processing by said transaction processing apparatus, information for specifying said transaction processing apparatus, information for specifying an operator of said transaction processing apparatus and the date and time of the completion of said processing by said transaction processing apparatus.

* * * * *